United States Patent
Gupta et al.

[11] Patent Number: 5,714,431
[45] Date of Patent: Feb. 3, 1998

[54] ZINC TITANATE SORBENTS

[75] Inventors: Raghubir P. Gupta; Santosh K. Gangwal, both of Durham, N.C.; Suresh C. Jain, Germantown, Md.

[73] Assignee: Research Triangle Institute, Research Triangle Park, N.C.

[21] Appl. No.: 325,853

[22] Filed: Oct. 19, 1994

[51] Int. Cl.$^6$ .............................. B01J 20/02; B01J 20/30
[52] U.S. Cl. ..................... 502/400; 502/406; 502/415; 502/514; 502/517
[58] Field of Search .................. 502/400, 514, 502/517, 406, 415

[56] References Cited

U.S. PATENT DOCUMENTS

| | | | |
|---|---|---|---|
| 4,287,050 | 9/1981 | Eastman et al. | 208/215 |
| 4,313,820 | 2/1982 | Farha, Jr. et al. | 208/213 |
| 4,394,297 | 7/1983 | Kolts | 252/437 |
| 4,732,888 | 3/1988 | Jha et al. | 502/406 |
| 4,946,814 | 8/1990 | Shi et al. | 502/62 |
| 4,977,123 | 12/1990 | Flytzani-Stephanopoulos et al. | 502/84 |
| 4,990,318 | 2/1991 | Kidd | 423/230 |
| 5,045,522 | 9/1991 | Kidd | 502/405 |
| 5,094,996 | 3/1992 | Kidd | 502/405 |
| 5,135,756 | 8/1992 | Shi et al. | 502/62 |
| 5,143,706 | 9/1992 | Schubert | 423/230 |
| 5,188,811 | 2/1993 | Ayala | 423/230 |
| 5,192,726 | 3/1993 | Holmgren | 502/62 |
| 5,234,884 | 8/1993 | Mouri et al. | 502/405 |
| 5,254,516 | 10/1993 | Gupta et al. | 502/84 |
| 5,330,943 | 7/1994 | Shi et al. | 502/62 |
| 5,334,564 | 8/1994 | Pinnavaia et al. | 502/84 |
| 5,494,880 | 2/1996 | Siriwandane | 502/400 |

FOREIGN PATENT DOCUMENTS

| 1297143 | 11/1989 | Japan | 502/400 |
|---|---|---|---|

OTHER PUBLICATIONS

"Enhanced Durability of Desulfurization Sorbents for Fluidized-Bed Applications" by Gupta et al. Printed in the U.S.A., Office of Scientific & Technical Information Oak Ridge Tennessee, Nov. 1992, Report No. NTIS/DE93000247, pp. 1–138.

S. K. Gangwal, R. Gupta, and W.J. McMichael, "Sulfur Control Options For Integrated Gasification Combined Cycle Power Systems", pp. 639–653, of the Proceedings of the Seventeenth Bienniel Low–Rank Fuels Symposium held in St. Louis, Missouri, May, 1993; published by Energy and Environmental Research Center, Grand Forks, ND.

"Toward A Cleaner Coal", Jan./Feb./Mar. 1994 Edition *Hypotenuse*, p. 16 published by Research Triangle Institute.

*Primary Examiner*—Gary P. Straub
*Assistant Examiner*—Timothy C. Vanoy
*Attorney, Agent, or Firm*—Bell Seltzer Intellectual Property Law Group; Alston & Bird LLP

[57] ABSTRACT

The present invention provides a zinc titanate sorbent material useful in desulfurization applications. The zinc titanate material is in the form of generally spherical particles of substantially uniform chemical distribution. The sorbent material is capable of absorbing sulfur compounds from a gaseous feed in an amount of at least about 15 weight percent based on the weight of the sorbent. The sorbent material is prepared by a process including: (a) forming a zinc oxide/titanium dioxide dry blend, (b) preparing a substantially uniform aqueous slurry comprising the zinc oxide/titanium dioxide dry blend, organic binder, and at least about 1 weight percent inorganic binder based on the solids weight of the slurry, (c) spray drying the slurry to produce substantially spherical particles, and (d) calcining the particles at a temperature of between about 750° C. to about 950° C. The dry blend is formed by mixing between about 0.5 to about 2 parts zinc oxide having a median particle size of less than about 0.5 µ, and about 1 part titanium dioxide having a median particle size of less than about 1 µ. The slurry contains substantially no free silica and may be prepared by the process including (1) preparing an aqueous solution of organic binder, (2) adding the dry blend to the aqueous solution of organic binder, and (3) adding the inorganic binder to the solution of organic binder, and blend. Additional reagents, such as a surfactant, may also be incorporated into the sorbent material. The present invention also provides a process for desulfurizing a gaseous stream. The process includes passing a gaseous stream through a reactor containing an attrition resistant zinc titanate sorbent material of the present invention.

14 Claims, No Drawings

ZINC TITANATE SORBENTS

This invention was made with Government Support under Contract No. DE-AC21-88MC25006 awarded by the United States Department of Energy. The Government has certain rights in this invention.

FIELD OF THE INVENTION

The present invention relates to zinc titanate sorbents, and more particularly to zinc timate sorbents having desirously high percent sulfur absorption capacity, and to processes of preparing the same.

BACKGROUND OF THE INVENTION

Coal represents our largest fossil energy source. The efficiency of converting the chemical energy stored in coal to electricity can be improved by first generating fuel gas via coal gasification, and then oxidizing the hot gas in either a turbine or a fuel cell. This approach, however, is complicated by the presence of sulfur in coal, which is convened to reduced sulfur species such as $H_2S$, COS, and $CS_2$ during gasification. Subsequently, during combustion of the fuel gas, the $H_2S$ oxidizes to $SO_2$ which is environmentally undesirable. In addition to environmental concerns, high concentrations of $H_2S$ can be detrimental to energy producing equipment. For example, this gas is corrosive to turbine blades, and other equipment, and it can adversely affect the performance of molten carbonate fuel cells due to sulfur poisoning of electrodes.

Initial methods of removing $H_2$ and other reduced sulfur species contemplated wet processes operated within a liquid phase, typically an amine solution. These processes typically require cooled fuel gas which imposes a severe thermal penalty, and have the secondary disadvantage of producing wastewaters which must be treated prior to release into the environment. The disadvantages associated with wet removal techniques led to the development of sorbents for the high temperature removal of reduced sulfur species.

Early sorbent technology was directed toward iron oxide. For example, U.S. Pat. No. 4,089,809 assigned to W. L. Farrior, disclosed a solid absorbent consisting of iron oxide supported on silica for removal of $H_2S$ from hot gaseous mixtures. The efficacy of iron oxide sorbents for the absorption of $H_2S$ is dictated by chemical equilibrium constraints. For example, at 550° C. with 20 percent water vapor in coal gas, theoretically iron oxide sorbents can reduce $H_2S$ levels to about 361 ppm, but typically not any lower.

In contrast, studies performed using zinc oxide as a sorbent indicate that $H_2S$ levels can be reduced to a few ppm. An example of a zinc oxide sorbent is proposed in U.S. Pat. No. 4,088,736 to Institut Francais du Petrole of France, which discusses a zinc oxide sorbent supported on silica and/or alumina. Zinc oxide sorbents hailed as effective sorbents for reduced sulfur species, however, the actual gasifier gases are quite reducing, and zinc oxide sorbents are typically not as effective in these environments as is required in the industry. Pure zinc oxide sorbents are known to lose zinc due to reduction by carbon monoxide and/or hydrogen, both of which are present in fuel gas.

Subsequently, zinc ferrite sorbents were developed. U.S. Pat. No. 4,769,045 to Grindley proposes a representative zinc ferrite sorbent prepared from mixing and calcination of equimolar amounts of zinc oxide and iron oxide. Zinc ferrite sorbents were employed in fixed-bed, moving-bed, and fluidized-bed reactors for desulfurization, but the concerns with respect to sorbent degradation in terms of loss in percent sulfur absorption capacity and mechanical strength remained.

Zinc timate sorbents were initially developed as an answer to the need for a desulfurization Sorbent which exhibits resistance to degradation at the high temperatures and highly reducing coal gas environments of the hot-gases. The use of zinc titanate sorbents as high temperature desulfurization sorbents is proposed in U.S. Pat. Nos. 4,313,820 and 4,725,415, both assigned to Phillips Petroleum Company. The sorbents proposed therein are discussed in relation to fixed bed applications, and have a particle size of 20 to 40 mesh, a size which is unsuitable for fluidized bed applications. U.S. Pat. No. 4,977,123 to Flytzani-Stephanopolous et al., proposes a method of making mixed metal oxide sorbents suitable for use in fixed bed reactors as well. The proposed mixed metal oxide absorbents are prepared using calcined powders of a desired composition as starting materials, adding water to form a paste, extruding the paste, and drying and heating the extruded paste to yield the desired extrudate strength. The oxides may be oxide mixtures of various metals such as for example, copper, iron, aluminum, zinc, titanium, and mixtures thereof. Inorganic binder materials such as bentonite clay may also be added. The proposed method involves a series of complex and potentially expensive steps which discourage its use in commercial applications.

Although fluidized bed reactors provide a particularly efficient environment for removal of sulfur compounds from feed streams, zinc titanate sorbent materials suitable for fluidized bed reactor applications have eluded investigators due to the required particle size range, typically from 40 to 300 microns. Fluidized bed reactor applications also require sorbents exhibiting good absorption rate and capacity for sulfur compounds, high regenerability without appreciable loss of efficacy or efficiency, and high attrition resistance.

Attempts have been made to improve the attrition resistance of zinc titanate materials for fluidized bed applications. U.S. Pat. No. 4,477,592 to Aldag, Jr. proposes a process for making a zinc titanate sorbent which includes a hydrogelling step designed to improve attrition resistance. The proposed hydrogelling step, involves dispersion of a finely powdered zinc titanate in a suspension of $\alpha$-alumina monohydrate with the addition of nitric acid to form a hydrosol, which is dried, calcined at 648° C. for 2 hours, and crushed and screened to produce a 420 to 1190 micron particle size catalyst for use in a transport reactor. The hydrogelling step improved attrition resistance at the expense of reduced catalytic activity primarily due to decreased zinc timate content.

U.S. Pat. No. 5,254,516, issued Oct. 19, 1993 to Gupta et al discloses highly durable and chemically reactive zinc titanate sorbents having a particle size range of between 50 and 400 µm which are prepared by granulating a mixture of fine zinc oxide and titanium dioxide with an inorganic binder, typically bentonite and/or kaolinite, and an organic binder, and then indurating the granulate. The resultant sorbent particles are highly attrition resistant and advantageously are capable of absorbing significant quantities of sulfur compounds from a feed stream. Because of their size, reactivity and durability, these sorbent materials are suitable for use in fluidized bed reactors. However, the granulation process results in the production of particles having sizes distributed over a relatively wide range and typically a substantial portion of the product, e.g. , 30–40 wt. percent, has a size too large for use in a fluidized-bed reactor and must be discarded. A related publication describes work leading to the development of this sorbent material; see R. P. Gupta and S. K. Gangwal, "Enhanced Durability of Desulfurization Sorbents for Fluidized Bed Applications", Topical Report to DOE/METC, Contract No. DE-AC21-

88MC25006, November, 1992, NTIS No. NTIS/ DE930000247. As detailed therein, numerous particle-forming techniques and zinc titanate/binder compositions were investigated prior to the development of these attrition-resistant zinc titanate sorbents.

One particularly desirable technique for the production of a particulate catalyst suitable for use in fluidized-beds is the spray drying process. This process has been employed extensively in the production of various catalysts, particularly fluid cracking catalysts. Spray drying offers a number of advantages over granulation or agglomeration particulate-forming processes. For example, spray drying is a commercial process which can be readily scaled to commercial production using existing technology to produce large quantities of a product. Spray drying facilitates the addition of other additives and reagents to the composition since additional reagents can simply be added to a slurry prior to spray drying. Spray drying can also provides particles of highly uniform size and shape. In the production of fluidized bed catalysts, the uniformity of the particulate product results in improved process economics in the form of a higher product yield. In many cases, conventional spray drying techniques can provide nearly a 100 percent yield of particles having a size suitable for use in a fluidized bed. In such cases, little, if any, of the spray dried particles must be discarded as waste.

Spray drying processes are well known in the art and are disclosed in numerous publications. In one spray drying process disclosed in U.S. Pat. No. 4,946,814 to SIft et al., an acid stable surfactant is used in combination with a silica-sol binder system to provide FCC catalysts of significantly improved morphology, selectivity, and attrition resistance. The acid stable surfactant can be added to any one, or all, of the final slurry components including the alum-silica sol slurry, the clay slurry, the alumina and/or the zeolite slurry.

To date, spray drying techniques have not successfully been applied to provide commercially useful zinc titanate desulfurization sorbents. Conventional spray drying involves the use of silica binders to produce coherent, attrition resistant particles. Although spray dried zinc titanate sorbents formed by conventional spray drying techniques and using conventional binders do exhibit improved attrition resistance, this has been achieved only at the expense of sulfur absorption capacity. Various attempts to prepare spray dried zinc titanate catalysts were made during the study described in the previously mentioned November, 1992, publication of R. P. Gupta and S. K. Gangwal, NTIS No. NTIS/DE930000247. In summary, when either a colloidal silica binder, or a silica binder in the form of polysilicic acid, were employed in the formulations, reactivity of the final sorbent was substantially eliminated. In one portion of the study a skilled outside contractor was commissioned to prepare a group of spray dried zinc titanate sorbents including zinc titanate sorbents free of silica and comprising binders prepared from only bentonite and an organic binder. However the resultant sorbents exhibited poor attrition resistance and an unacceptably low sulfur absorption capacity of less than 12 weight percent sulfur absorption. Subsequent attempts to produce spray dried zinc titanate sorbent materials were commissioned during the course of the above investigation and involved variations in the components used to prepare sorbents. These attempts, although not reported in the above publication were also unsuccessful. In the case of the latter attempts, the use of preferred zinc titanate particle-forming components during the spray drying process resulted in the failure to produce a stable slurry, resulting in turn, in failure of the particulate-forming spray drying step.

SUMMARY OF THE INVENTION

The present invention provides zinc titanate sorbent materials in the form of generally spherical particles of substantially uniform size, shape and chemical distribution. The zinc titanate sorbent materials of the present invention exhibit high percent sulfur absorption capacity and in preferred embodiments, high attrition resistance. The zinc titanate sorbent materials of the invention are prepared using spray drying techniques, without the use of free silica-containing binders. Despite the elimination of free silica-containing binders in the sorbent composition, the zinc titanate sorbents of the present invention have substantially uniform spherical particles, and can provide improved percent sulfur absorption capacity and attrition resistance as compared to previous zinc titanate sorbents.

The zinc titanate sorbent materials of the present invention are prepared by the process comprising (a) forming a zinc oxide/titanium dioxide dry blend, (b) preparing a substantially uniform aqueous slurry comprising the zinc oxide/titanium dioxide dry blend, organic binder, and inorganic binder, (c) spray drying the slurry to produce substantially spherical precursor particles, and (d) calcining the particles under conditions sufficient to convert the zinc oxide and titanium dioxide to zinc titanate. The inorganic binders useful in the present invention contain essentially no "free silica." In accordance with the invention it has been discovered that the presence of binders which contain "free silica" in the sorbent composition negatively impacts the sulfur absorption capacity of the sorbent. The sulfur absorbing capacity of the sorbent decreases dramatically upon the addition of free silica-containing binders which were commonly used in previously known spray drying techniques. It was previously believed that the addition of free silica-containing binders was necessary to achieve spherical particles of substantially uniform size and shape and high attrition resistance in spray drying. However, despite the absence of these binders, the sorbents of the present invention are generally spherical particles of substantially uniform size and shape and exhibit a relatively high attrition resistance. Typically, almost 100 percent of the particles exhibit an average particle size between about 40 and about 150 microns.

The first step of the process involves forming a dry blend of zinc oxide and titanium dioxide. Typically, the blend includes between about 0.5 to about 2 parts particulate zinc oxide and about 1 part particulate titanium dioxide. Advantageously, the solid reagents useful in the present invention typically exhibit a fine particle size. Zinc oxide useful in the present invention typically has a very free median particle size of less than about 0.5 micron, and preferably between about 0.1 and about 0.5 micron. The titanium dioxide useful in the present invention typically exhibits a median particle size of less than about 1 micron, and preferably between about 0.1 and about 1 micron. Preferably, the zinc oxide and titanium dioxide useful in the present invention contain substantially no silica, and less than 5 percent alumina by weight.

A substantially uniform slurry is then prepared using the zinc oxide/titanium dioxide blend. In addition, the slurry includes the organic binder, the inorganic binder, and any additional reagents desired for imparting additional properties to the sorbent material. The slurry is typically prepared by (1) preparing an aqueous solution of the organic binder, (2) adding the dry blend to the solution of organic binder, and (3) adding the inorganic binder to the solution containing the organic binder and the blend. Typically, the entire process is carried out while mixing to provide a uniform slurry. The solids concentration of the slurry is a noteworthy factor which is capable of impacting the particle size of the end product. Advantageously, the solids concentration of the slurry is typically maintained between about 10 and about 30 weight percent solids.

Although various organic binders can readily be used in the invention, preferred organic binders useful in the inventive process for making zinc titanate sorbent materials are typically selected from the group consisting of hydroxypropyl methyl cellulose, polyvinyl acetate, cellulose, hydroxypropyl cellulose, starch, lignin sulfonate, molasses, and mixtures thereof. The most preferred organic binder is hydroxypropyl methyl cellulose. The organic binder is typically employed in the form of an aqueous solution. Preferably sufficient organic binder is used to provide an aqueous solution having a viscosity of between about 400 and about 600 cP in order to enhance dispersion of the zinc oxide and titanium dioxide. The mount of organic binder required to obtain the desired viscosity is dependent upon the particular organic binder selected. Typically, the aqueous solution comprises between about 0.2 and about 20 weight percent organic binder based upon the weight of the aqueous solution. In the embodiment wherein the organic binder is METHOCEL™ brand of hydroxypropyl methyl cellulose, in grade K-100M, the aqueous solution comprises between about 0.2 and about 1 weight percent organic binder based on the weight of the aqueous solution.

The inorganic binders useful in the present invention contain substantially no free silica. The preferred inorganic binder is sodium bentonite. Sodium bentonite may be mixed or combined with other non-free silica-containing inorganic binders as well. Other suitable inorganic binders typically include other forms of bentonite, kaolinite, forsterite, vermiculite, feldspar, Portland cement, oil shale, calcium sulfate and mixtures thereof. The inventors have found that the inclusion of sodium bentonite results in improved percent sulfur absorption capacity over sorbents prepared using other inorganic binders. The inorganic binder is present in an amount of at least about 1 weight percent. Advantageously, sodium bentonite is present in an amount of between about 1 and about 10 percent, and preferably is present in an amount available to zinc titanate of between about 3 and about 8 percent, more preferably between about 4 and about 6 percent, and most preferably in an amount of about 5 percent. The phrase "mount available to zinc titanate" as used herein refers to the use of a combination of one or more inorganic binders with the sodium bentonite. In such cases, a portion of the sodium bentonite can bind to the other binder and thus be unavailable to the zinc titanate. Accordingly, the "mount available" of sodium bentonite is that mount of sodium bentonite which, when used in combination with another binder, is sufficient to provide a sorbent material having sulfur absorption activity equivalent to sorbent material prepared with an inorganic binder which is solely relatively pure sodium bentonite in the specified amount.

The slurry, once prepared, is spray dried to produce substantially spherical precursor particles. Any suitable method known to those skilled in the art for spray drying the slurry may be employed. Typically, the slurry is spray dried using a spinning wheel atomizer operating at elevated temperatures. Typically, the atomizer is operated at an inlet temperature maintained above about 300° C., preferably above about 340° C., and an outlet temperature maintained above about 125° C., and preferably above about 145° C.

Some of the advantages of spray drying techniques have been set forth above. In addition, spray drying has been found to generate a more homogeneous chemical distribution of zinc oxide and titanium dioxide, thus diminishing or even eliminating, deleterious amounts of segregated zinc oxide. Also as noted above, spray drying has the added advantage that substantially all of the produced sorbent material is in a useable form.

The precursor particles exit the atomizer and are calcined under conditions sufficient to convert the zinc oxide and titanium dioxide to zinc titanate. Typically, the particles exit the atomizer and are directed into an oxidizing environment maintained at a temperature of between about 750° C. and about 900° C. for a sufficient period of time to convert the zinc oxide and titanium dioxide to zinc titanate. Preferably, the particles are calcined for between about 1 and about 4 hours in the oxidizing environment. More preferably, the particles are calcined at a temperature of between about 800° C. and about 850° C. for about 2 hours.

The zinc titanate sorbent materials of the present invention may also advantageously include other reagents. In one particularly preferred embodiment of the present invention a surfactant is used in preparing the zinc titanate sorbent. The surfactant is suitably added to the solution of blend, organic binder, and inorganic binder and mixed prior to spray drying. The addition of the surfactant serves a variety of useful functions. For example, the surfactant produces a more uniform distribution of zinc oxide and titanium dioxide in the slurry, and improves the attrition resistance of the spray dried particles without degrading the percent sulfur absorption capacity of the particles. A more uniform distribution of zinc oxide and titanium dioxide is important to the preparation of effective zinc titanate sorbents. A non-uniform distribution of zinc oxide and titanium dioxide means that the sorbent can contain free zinc oxide. The presence of free zinc oxide in the sorbent can be deleterious, as even relatively small mounts of free zinc oxide can lead to sorbent degradation. Preferred surfactants for use in the method of the present invention include acid stable surfactants. Particularly preferred acid stable surfactants include fluorohydrocarbon surfactants.

The zinc titanate sorbent materials of the present invention may also include one or more other reagents or additives which are capable of imparting secondary functions to the sorbent. For example, reagents or additives may be added which impart catalytic capabilities to the sorbent, such that the sorbent is not only capable of removing sulfur compounds, but is also capable of effecting other useful chemical changes to a feed stock. Examples of reagents or additives which may advantageously be incorporated into the zinc titanate sorbents of the present invention include, but are not limited to oxides and sulfides of molybdenum, cobalt, copper, tungsten, and nickle.

The zinc titanate sorbent materials of the present invention are capable of absorbing sulfur compounds in feed stock. Typically, the sorbents exhibit a percent sulfur absorption capacity with hydrogen sulfide in excess of 15 weight percent sulfur absorption at saturation. Sorbents prepared with the addition of surfactant also exhibit high attrition resistance. Typically, the attrition resistance of the sorbents is less than about 20 percent loss after 20 hours, as measured in a 3-hole attrition tester. This represents a dramatic increase in attrition resistance over previously known sorbents.

The zinc titanate sorbents of the present invention may advantageously be employed in processes of desulfurizing a feed stock, such as a gaseous stream containing reduced sulfur species. An exemplary method of desulfurizing a gaseous stream includes treating the stream in a reactor containing the zinc titanate sorbent material prepared according to the method of the present invention. Suitable reactors include both fluidized bed reactors and entrained bed reactors. In many cases, subjecting the gaseous stream to treatment with the zinc titanate sorbent of the present invention can effectively result in the removal of substantially all of the sulfur in the stream.

DETAILED DESCRIPTION OF THE PREFERRED EMBODIMENT

In the following detailed description, preferred embodiments of the invention are described to enable practice of the invention. Although specific terms are used to describe and illustrate the preferred embodiments, such terms are not intended as limitations on practice of the invention and numerous variations and modifications of the invention will be apparent to those of skill in the art. As used herein, the phrase "free silica" refers to silica which is either in a free form and therefore available for reaction with zinc oxide, or silica forms which may, under the conditions of the process of the present invention, produce free silica. The phrase "free silica" does not include bound silicon oxides, such as aluminosilicates which, under the conditions of the process of the present invention, are incapable of releasing free silica.

The zinc titanate sorbent materials of the present invention are particularly useful in gaseous desulfurization applications, especially in fluidized or entrained bed reactors. In particular, the zinc titanate sorbents of the present invention exhibit a high percent sulfur absorption capacity to reduced sulfur species, such as for example $H_2S$, COS, and $CS_2$, and a high sulfur capture capacity, as well as other advantageous characteristics for desulfurization applications. In addition, the zinc titanate sorbents of the present invention have oil refinery applications in the area of $SO_x$ removal. For example, the zinc titanate sorbents of the present invention may be used for the removal of $SO_x$ species including, but not limited to $SO_2$, $SO_3$, and the like. The zinc titanate sorbent of the present invention can also be used for hydrolysis of COS. The sorbent material is currently believed to convert the COS into hydrogen sulfide, which is then removed by absorption.

The zinc titanate sorbent materials of the present invention exhibit a generally spherical shape and substantially uniform chemical distribution of zinc oxide and titanium dioxide. These sorbent materials also exhibit high percent sulfur absorption capacity and attrition resistance, which are retained over extended periods of use, i.e., over numerous desulfurization-regeneration cycles.

The zinc titanate sorbent materials include particulate zinc oxide and particulate titanium dioxide in suitable molar ratios. Preferred molar ratios of zinc oxide to titanium dioxide will depend on a number of factors, such as the reducing severity of coal gas, desulfurization temperature, and the like. Typically, the sorbent materials include zinc oxide and titanium dioxide in a molar ratio of about 0.5–2:1. Preferably, the zinc oxide and titanium dioxide are employed in a molar ratio of about 1.5:1.

Advantageously, the particulate zinc oxide starting materials useful in preparing the zinc titanate materials of the present invention exhibit a very fine particle size. Preferably, the particulate zinc oxide starting material has a median particle size of less than about 0.5 microns and a surface area of between about 5 and about 15 $m^2/g$. More preferably, the particulate zinc oxide starting materials will have a median particle size between about 0.01 and about 0.5 microns, and a surface area of about 9 $m^2/g$. Particularly preferred particulate zinc oxide will have a median particle size of about 0.1 microns. Additionally, the zinc oxide contains substantially no free silica and less than 5 percent free alumina, and is preferably in a relatively pure form. For example, zinc oxide materials having a purity in excess of 99 percent are preferred. Zinc oxide starting materials having the preferred particle size may be obtained from the Zinc Corporation of America under the tradename KADOX-911™. This material is prepared according to a French method in which zinc melt, produced from zinc ore, is boiled in a refining column at 907° C. to produce vapors. The vapors are reacted with a predetermined amount of air to produce the zinc oxide powder having the specified particle size.

The particulate titanium dioxide starting materials useful in preparing the zinc titanate materials of the present invention preferably also exhibit a fine particle size. Preferably, the titanium dioxide starting material has a median particle size of less than about 1 micron, and a surface area of between about 5 and about 15 $m^2/g$. More preferably, the particulate titanium dioxide has a median particle size of between about 0.1 and about 0.5 microns, and a surface area of about 12 $m^2/g$. Particularly preferred particulate titanium dioxide will have a median particle size of about 0.5 microns. Suitable titanium dioxide starting materials will contain substantially no free silica and less than 5 percent free alumina. Particulate titanium dioxide having a relatively high purity, preferably greater than 90 percent, more preferably greater than 94 percent, are preferred. Either the anatase or rutile crystalline forms of titanium dioxide may be employed, although the rutile crystalline form is currently preferred because it is less expensive. Suitable particulate titanium dioxide for use in the method of the present invention may be obtained from duPont Company under the tradename R-900™.

The organic binder may be any suitable binder known to those skilled in the art. Preferably, the organic binder is a material capable of substantially complete removal by oxidation, evaporation, or a similar destructive or non-destructive removal process during calcination so that it imparts to the final sorbent material, the desired degree of porosity. Examples of suitable organic binders include, but are not limited to, hydroxypropyl methyl cellulose, propylvinyl acetate, cellulose, hydropropyl cellulose, starch, lignin sulfonate, molasses, and mixtures thereof. Preferably, the organic binder is hydroxypropyl methyl cellulose.

The amount of organic binder necessary to prepare the solution comprising organic binder is dependent upon the particular organic binder chosen, and its innate viscosity characteristics. The amount of organic binder preferably is sufficient to provide an aqueous solution having a viscosity of between about 400 and about 600 cP, more preferably between about 450 and about 550 cP. The viscosity of the aqueous solution is desirably within this range to provide sufficient dispersion of the zinc oxide and titanium dioxide particulate. Typically, the organic binder is present in the aqueous solution in an amount of between about 0.2 and about 20 weight percent based upon the weight of the aqueous solution. According to one preferred embodiment, the organic binder solution comprises between about 0.2 and about 1 weight percent based upon the weight of the aqueous solution, of METHOCEL™ grade K-100M (available from dupont Chemical) in aqueous solution. The preferred organic binders are materials which can provide an aqueous solution of the desired viscosity with the addition of only a small amount of binder material i.e., less than about 5 wt.

percent binder, more preferably less than about 1 wt. percent binder. Organic binders which require the addition of larger amounts to obtain the desired viscosity can result in excess porosity in the final sorbent material. This excess porosity disadvantageously reduces the strength of the sorbent material. Preferably, the aqueous solution comprises substantially pure water, although other acids, bases, salts, and the like, which do not affect the properties of the end product sorbent may be added. Examples of acceptable additives include, but are not limited to soluble salts and various metal oxides.

Inorganic binders useful in the preparation of the zinc titanate sorbents include any suitable inorganic binder known to those skilled in the art which contains substantially no free silica. As previously noted, the presence of free silica-containing binders negatively impacts the percent sulfur absorption capacity of the resulting sorbents. Substantially pure sodium bentonite is the preferred inorganic binder. Other forms of bentonite, such as calcium bentonite may be employed, however, this is not currently preferred because calcium bentonite must be calcined at a higher temperature to function as a binder. However, calcining the precursor particles at a higher temperature results in sintering, which leads to increased pore size and correspondingly decreased surface area. The decreased surface area results in diminished sulfur absorption capacity as compared to sorbent materials prepared using sodium bentonite. The inventors have found that the use of sodium bentonite provides sorbent materials having superior sulfur absorption capacity and attrition resistance as compared to sorbent materials prepared using other inorganic binders. Sodium bentonites, which contain between about 2 to about 3 percent sodium are particularly preferred inorganic binders because of (1) their strong electrical charges, (2) their smaller sized particles and greater surface area (approximately 30 m$^2$/g), (3) the sponge-like character of their lattice which permits the free gress and egress of ions that may be present in the water, and (4) their suspendability and mobility in water which provides a greater opportunities for collision with other floating ions. Sodium bentonites, commonly known as "volclays" are widely used as binders for these reasons.

The inorganic binder of the present invention may include mixtures or blends of sodium bentonite with other suitable non-free silica-containing inorganic binders. Examples of suitable inorganic binders include, but are not limited to other forms of bentonite, kaolinite, forsterite, vermiculite, feldspar, Portland cement, oil shale, calcium sulfate and mixtures and blends thereof. Bentonite which is useful in the practice of the present invention typically has an approximate composition of: $SiO_2$-63%, $Al_2O_3$-21%, $Fe_2O_3$-3%, $MgO$-$_{2.5}$%, $Na_2O$-2.5%, and $H_2O$-balance. The primary clay mineral of bentonite is montmorillonite, which is composed essentially of an aluminum oxide sheet sandwiched between two silicon dioxide sheets. In contrast, kaolinite is composed essentially of only one silicon dioxide sheet and one aluminum oxide sheet.

Kaolinite may also be employed in the preparation of the zinc titanate sorbents of the invention. The kaolinite typically has an approximate composition of $SiO_2$-45%, $Al_2O_3$-38.5%, $Fe_2O_3$-0.5%, $TiO_2$-2%, $Na_2O$-0.2%, $CaO$-0.1%, and $H_2O$-balance. The particles typically exhibit an average particle size of about 1.8 microns and a surface area of between about 9 to about 11 m$^2$/g. Preferably, kaolinite is employed in combination with a fluxing agent such as feldspar and sodium silicate.

Other suitable inorganic binders include forsterite and vermiculite. Forsterite is a high-temperature refractory composed of magnesium silicate. Vermiculite also exhibits excellent high temperature strength. Neither forsterite nor vermiculite alone provides the superior binding properties observed in the use of bentonite. Accordingly these binders are preferably mixed with other inorganic binders, and in particular sodium bentonite, to provide a suitable inorganic binder for use in the method of the present invention.

Typically, the inorganic binder is added in an amount sufficient to effectively and vigorously bind the zinc oxide and titanium dioxide molecules to form the zinc titanate. Necessarily, the optimal amount of inorganic binder will depend upon the particular inorganic binder(s) selected. Typically, the sodium bentonite is present in an amount available to zinc titanate of at least about 1 weight percent. Preferably, the inorganic binder includes an amount available of sodium bentonite of between about 1 and about 10 weight percent, more preferably an amount available of between about 3 and about 8 weight percent, still more preferably in an amount available of between about 4 and about 6 weight percent and most preferably in an amount available of about 5 weight percent.

The zinc titanate sorbent material is prepared by first dry blending the particulate zinc oxide and particulate titanium dioxide starting materials to form a dry blend. The zinc oxide and titanium dioxide may be dry blended according to any method known to those skilled in the art. For example, the zinc oxide and titanium dioxide may be blended using a high shear mixer for a period of time sufficient to create a relatively uniform particulate dispersion of zinc oxide and titanium dioxide. Preferably, the zinc oxide and titanium dioxide are mixed in the high shear mixer for between about 30 and about 60 minutes. One skilled in the art will appreciate that other methods of blending zinc oxide and titanium dioxide are contemplated by the method of the present invention as well.

Thereafter, a substantially uniform aqueous slurry is prepared which includes the zinc oxide/titanium dioxide dry blend, organic binder, and inorganic binder. Typically, the slurry is prepared by (1) preparing an aqueous solution comprising organic binder, (2) adding the dry blend to the solution of organic binder, and (3) adding the inorganic binder to the solution of organic binder and blend. Preferably, the entire process of preparing the slurry is carried out while mixing. More particularly, it is preferred to add the blend to the solution of organic binder while mixing the solution, and to add the inorganic binder while mixing the solution of organic binder and blend. One skilled in the art will appreciate that steps (2) and (3) are advantageously carried out sequentially, although it is possible to perform these steps simultaneously. The present invention also contemplates inversions of the foregoing steps. For example, it is possible, and contemplated by the present invention, that the zinc oxide/titanium dioxide blend may be added to the solution containing both the organic and inorganic binders, although this is currently not the preferred method of carrying out the present invention. It is also possible, although not currently preferred, to combine the zinc oxide/titanium dioxide dry blend with the inorganic binder prior to adding both to the solution containing the organic binder.

The solution comprising the organic binder is preferably prepared in a baffled tank equipped with a high shear mixer, or other suitable mixing or stirring device. Typically, the solution is prepared by adding a predetermined amount of the organic binder to an aqueous solution, as defined above. Thereafter, the blend may be added to this solution, by simply dispensing the blend into the tank containing the solution comprising the organic binder, preferably while mixing. The inorganic binder may be added in a similar manner. In embodiments wherein the inorganic binder comprises two or more inorganic binder materials, as described above, it may be advantageous to blend the two or more inorganic binder materials prior to adding to the solution comprising the organic binder and the zinc oxide/titanium dioxide dry blend.

The solids concentration of the prepared slurry affects the size of the particles produced. In particular, the solids concentration of the slurry should be carefully controlled to produce particles of the desired size. In accordance with the present invention, it has been found that a slurry having a solids concentration of between about 10 and about 30 weight percent solids produces sorbent particles wherein greater than about 60 to 90 percent of the particles have an average size of between about 40 and about 150 microns.

The slurry is then spray dried to produce substantially spherical precursor particles. The spray drying technique of the present invention is nonconventional in that the addition of free silica-containing binders conventionally believed to be necessary for spray drying are eliminated from the slurry. Typically, the slurry is spray dried using a spinning wheel atomizer operating at elevated temperatures. Spinning wheel atomizers are well known by those skilled in the art, and any suitable spinning wheel atomizer may be employed in the practice of the method of the present invention. Preferably, the atomizer is operated at an inlet temperature maintained at above about 340° C. and an outlet temperature maintained at above about 145° C. The atomizer wheel speed is preferably operated at about 10,000 rpm, although suitable speed settings may be readily determined by one skilled in the art.

Subsequently, the precursor particles exit the atomizer, and are then calcined under conditions sufficient to convert the zinc oxide and titanium dioxide to zinc titanate. Typically, the precursor particles exit the atomizer and are directed into an oxidizing environment maintained at a temperature of between about 750° C. to about 900° C. for a sufficient period of time to convert the zinc oxide and titanium dioxide to zinc titanate. Suitable oxidizing environments will be readily determinable by one skilled in the art. For example, according to one preferred embodiment, the precursor particles are directed into a kiln operating under an oxidizing environment maintained at a temperature of between about 750° C. and about 900° C. A suitable oxidizing environment will be readily determinable by those skilled in the art. For example, air may be used as the oxizing environment to complete the solid-solid reaction between zinc oxide and titanium dioxide to zinc titanate. Preferably, the precursor particles are calcined for between about 1 and about 4 hours in the oxidizing environment. According to one preferred embodiment, the precursor particles are calcined at a temperature of between about 800° C. and about 850° C. for about 2 hours.

The entire quantity of zinc titanate particles produced may advantageously be recovered and employed as sorbents without further modification or purification. The spray drying method advantageously generates a yield of nearly 100 percent usable zinc titanate particles, which provides a significant technoeconomic advantage as compared to granulation and similar techniques which produce only about 60 to 70 percent usable particles.

During the calcination process, the organic binder tends to burn off, as noted above. The incineration of the organic binder forms a porous structure equivalent to a network of mini canals which facilitate the flow of feed stock gases to a large reaction surface area.

Advantageously additional reagents or additives may be incorporated into the zinc titanate particles or added during the process of preparing the sorbents. According to one preferred embodiment of the instant invention, the process for preparing the zinc titanate sorbents includes the addition of a surfactant. Typically, the surfactant is an acid stable surfactant, such as those described in U.S. Pat. No. 5,135, 756 to Shi et al., the disclosure of which is incorporated herein by reference in its entirety. Preferred surfactants are fluorohydrocarbon surfactants having the general formula

wherein $R_f$ is $F(CF_2-CF_2)_{3-8}$ and X is H Or $NH_4$. Examples of preferred fluorohydrocarbons useful as surfactants in the present invention include, but are not limited to fluorohydrocarbon surfactant available under the trade name ZONYL TBS™ from duPont Chemical, potassium perfluoroalkyl sulfonates, such as SC-95™ available from 3M, and the like.

The surfactant imparts a number of beneficial characteristics to the zinc titanate sorbents of the present invention prior to being burned off in the calcination step. Namely, the presence of the surfactant produces a more uniform distribution of zinc oxide and titanium dioxide in the slurry. This is advantageous in that a more uniform chemical distribution abates free zinc oxide. In addition, the surfactant leads to more uniformly sized and shaped sorbent particles. The more uniformly sized and shaped particles exhibit higher attrition resistance. Furthermore, the presence of the surfactant increases attrition resistance without compromising sulfur absorption capacity.

The process for making the zinc titanate sorbent which includes the addition of surfactant can be carried out in substantially the same manner as the sorbent prepared without the addition of surfactant. More particularly, the surfactant is typically added to the solution comprising the blend, organic binder, and inorganic binder and mixed prior to spray drying. However, one skilled in the art will appreciate that other routes of addition, such as those outlined above are also contemplated.

The preferred surfactants are generally effective in very low concentrations of between about 50 and about 1000 ppm or between about 0.005 and about 0.1 weight percent (based on the weight of solids). Thus, the preferred surfactants are cost effective. In industrial applications, the surfactant is typically added in an amount of about one pound per 2.5 tons of final sorbent product. Additionally, it can be advantageous to dilute the surfactant prior to addition to the solution comprising organic binder. In this embodiment, the surfactant is preferably pre-diluted and added as a 1 weight percent aqueous solution.

Still other reagents or additives may also be incorporated into the zinc titanate sorbent materials of the present invention. In particular, the inventors have discovered that additional chemical functions, such as for example catalytic properties, may be ascribed to the sorbent upon the addition of certain reagents. As an example, the addition of oxides or sulfides of various Group I, VI, and VIII transition metals may be employed. Particularly preferred catalytic additives for heavy hydrocarbon cracking include oxides or sulfides of molybdenum, cobalt, copper, tungsten, and nickel. Heavy hydrocarbons, such as tars, are present in fuel gas and are usually derived from fixed-bed gasifiers such as the Lurgi and British Lurgi designs. The zinc titanate sorbent materials of the present invention which incorporate these additives may also act as catalysts to hydrodesulfurize the organic compounds present in the heavy hydrocarbons, such as mercaptans, thiophenes, and benzothiophenes, into hydrogen sulfide, which can subsequently be removed by the zinc titanate sorbent material.

Another potential contaminant in fuel gas is ammonia, which originates mainly from the fuel-bound nitrogen in coal. The quantity of ammonia in fuel gas may be as high as 2000 ppm. One of the most practical ways to remove this contaminant is catalytic decomposition to nitrogen and hydrogen. Suitable catalysts for decomposition of ammonia in combination with the zinc titanate sorbents of the present invention should exhibit relatively high resistance to poisoning with sulfur. Combinations of transition metal oxides, particularly Group VIII metal oxides, e.g., derived from cobalt and nickel with Group VI metal oxides, e.g., derived from molybdenum and tungsten, with and without additional Group VII and Group VIII metals such as rhenium and iridium, are suitable catalysts for ammonia decomposition. These additives may be incorporated into the zinc titanate sorbent materials of the present invention in the same manner as described above for the surfactant. The optimal amount of additive is readily determinable by one skilled in the art.

A detailed physical and chemical characterization of the zinc titanate sorbent materials prepared according to the processes of the present invention was carried out. The evaluation of physical characterization includes an analysis of particle size distribution, pore size distribution, (BET) surface area, X-ray defraction patterns, scanning electron microscopy (SEM) coupled with energy-dispersive X-ray (EDX), and attrition resistance. The evaluation of chemical characteristics includes percent sulfur absorption capacity measured in a thermogravimetric analyzer.

The particle size distribution can be determined using a sieve train and sonic sifter according to techniques known to those skilled in the art. The pore size distribution can be measured using conventional techniques, such as for example techniques employing the AutoPore 11 9220 instrument manufactured by Micromeritics Instrument Company. The BET surface area can be evaluated using conventional techniques, such as techniques employing a Quantasorb analyzer.

The sorbent materials produced according to the processes of the present invention typically exhibit an average particle size of between about 40 and about 150 microns. By this we mean that typically greater than about 95 percent, preferably greater than about 98 percent, and more preferably greater than about 99 percent of the particles produced by the method of the present invention will have an average particle size of between about 40 and about 150 microns. This particle size is advantageously well within the required range for fluidized-bed reactor applications. In addition, the method of the present invention may be used to produce larger particles having an average particle size of up to about 300 microns. Larger size particles may be produced by modifying the spray drying conditions, as will be appreciated by one skilled in the art. The surface area of the particles is typically between about 3 about 6 $m^2/g$.

Attrition resistance is a direct measure of the mechanical strength of the sorbent material. It is preferred for applications in fluidized-bed reactors, that the sorbent material possess a relatively high attrition resistance so that percent sulfur absorption capacity is not compromised after extended periods of use, and so that the sorbent material may be repeatedly regenerated rather than discarded once saturation has occurred. There are no standard American Society for Testing and Materials (ASTM) procedures for evaluating attrition resistance of particles in the 50 to 400 micron range. Rather, catalyst manufacturers have developed their own versions of an attrition test. As a reference point in these tests, commercial fluid cracking catalysts are typically employed.

A three-hole tester was employed to evaluate attrition resistance. A detailed description of this tester can be found in U.S. Pat. No. 4,010,116 to Secor et al. The zinc titanate sorbent materials of the present invention were analyzed using substantially the same test as described in Secor et al. '116, with the exception that house air was substituted in place of the humid air employed by Secor et al., and attrition rate was calculated rather than using the attrition index of Secor et al. Briefly, the attrition tester includes two sections. The upper section of the tester has a diameter of 5-¾ inches and the lower section has diameter of 1-⅝ inches. The large diameter of the upper section serves as an elutriator for the separation of fines less than 20 μ, which are ultimately collected in the flask/filter assembly. A perforated plate is used which contains three 0.4 mm diameter holes. Attrition resistance is measured in terms of attrition rate. Attrition rate is determined by loading 50 g of sample of known particle size range into the tester, passing air through the tester at the rate of 7 slpm, and intermittently stopping the gas flow after 5 hours and weighing the filter/flask assembly to determine the amount of fines collected. The test is continued for up to about 20 hours, and the remaining sample is collected from the tube, and weight and particle size distribution are measured.

Attrition resistance is calculated by measuring the amount of fines collected over 5 hours and 20 hours and the percent loss is calculated based on the initial 50 g of sorbent loaded into the tester. Attrition tests are relative tests, and an absolute value cannot be assigned. These tests are, however, widely recognized in the art as useful for establishing a relative ranking of materials in terms of attrition resistance.

The zinc titanate sorbent materials of the present invention typically exhibit an attrition resistance of less than about 87 percent after 5 hours, and less than about 95 percent after 20 hours using the three-hole attrition tester. The zinc titanate sorbent materials prepared with the addition of surfactant demonstrate a substantially higher attrition resistance. Typically the zinc titanate sorbent materials prepared with the addition of surfactant exhibit an attrition resistance of less than about 15 percent after 5 hours, and less than about 20 percent after 20 hours using the three-hole attrition tester. Both materials exhibit attrition resistance sufficient for applications in entrained bed reactors, however, due to its substantially higher attrition resistance, zinc titanate sorbent materials prepared with the addition of surfactant are preferred for fluidized bed reactors.

In a commercial system, to minimize the material losses due to attrition, the material can advantageously be used in a partially sulfided state to improve its attrition resistance. Consequently, the partially sulfided material will substantially reduce the sulfate formation during regeneration which is believed to be catalyzed by zinc oxide. It has been discovered that a complete sulfidation of zinc titanate material is not needed as partial sulfidation improves the attrition resistance significantly. Partial sulfidation of these materials may be achieved by treating them with a slip-stream of hydrogen sulfide containing reducing gas under mildly fluidizing conditions. Once a desired level of sulfidation is achieved, the material may be used for an actual operation. Such an arrangement may lead to a significant reduction in the amount of material lost due to attrition, which will eventually result in tremendous cost savings despite the initial costs associated with the partial sulfidation procedure.

The sulfur absorption capacity of the sorbent materials can be evaluated using a thermogravimetric analyzer (TGA). TGA sulfur absorption capacity can be evaluated using a duPont 1090 Thermal Analysis system interfaced with a computer in a simulated gas, according to methods known to those skilled in the art. The zinc titanate sorbent materials prepared according to the processes of the present invention exhibit a sulfur absorption capacity in excess of about 15 weight percent sulfur absorption at saturation, and preferably in excess of about 20 weight percent sulfur absorption at saturation. The percent sulfur absorption capacity is calculated by measuring the increase in mass of the sorbent following absorption of sulfur species, and doubling the percent mass increase. Doubling the percent mass increase is required because when zinc titanate reacts to form zinc sulfide, an atom of oxygen is released as each atom of sulfur is absorbed. Accordingly, for each 16 g increase in weight, 32 g of sulfur have been absorbed.

The zinc titanate sorbents prepared according to the processes of the present invention are useful in processes for desulfurizing feed stock, particularly gaseous feed stock. The sorbents of the present invention exhibit a high sulfur absorption capacity to reduced sulfur species, such as for example $H_2S$, COS, and $CS_2$, a high sulfur capture capacity, good regenerability and high attrition resistance, as described above. An exemplary method of desulfurizing a gaseous stream of feed stock includes treating the stream in a reactor containing the zinc titanate sorbent material prepared according to the method of the present invention. Preferably, subjecting the gaseous stream to the zinc titanate sorbent of the present invention effectively results in the removal of substantially all of the sulfur in the stream. Both entrained-bed and fluidized-bed reactors are suitable for use with the sorbent materials prepared according to the process of the present invention.

Entrained-bed and fluidized-bed reactors are well known in the art. In the Examples which follow, a typical bench scale fluidized bed reactor system is employed which comprises a 3 inch I.D. SS-316 pipe with a porous alumina plate in the bottom that acts as a gas distributor. The exit gas from the reactor is cooled to condense the steam and a slip stream of water-free gas is sent to an attached gas analysis system containing a series of gas chromatographs and continuous analyzers. In a typical bench run, about 500 g of the sorbent of particle size between about 40 to about 150 microns is placed in the reactor and the reactor is heated to a predetermined temperature, typically between about 550° C. and about 750° C. with continuous flow of nitrogen or other inert gas. Once the desired temperature is attained, the flow of fuel gas to the reactor is started and the concentration of hydrogen sulfide is measured continuously in the effluent gas. Once the hydrogen sulfide concentration reaches 500 ppmv, the run is stopped and the system is prepared for regeneration.

Regeneration of the sulfided material is typically carried out at about 700° C. with 2 to 5 percent oxygen in nitrogen. These regeneration conditions are needed to prevent zinc sulfate formation and to avoid deadburning of the material due to an excessive rise in temperature because of the highly exothermic nature of the regeneration reaction. The regeneration of the sulfided material is carried out until the sulfur dioxide ($SO_2$) concentration in the reactor effluent stream reaches below about 200 ppm. These sulfidation-regeneration cycles are repeated as many times as desired. Typically each material is tested for 10 cycles to obtain meaningful data on mechanical durability and sulfur absorption capacity.

A process for the desulfurization of a gaseous stream using an entrained-bed reactor may be carried out in a similar manner, with the adjustments required being well within the skill of those in the art.

The following examples are provided to illustrate the present invention, and should not be construed as limiting thereof. In these examples, percent (%) means percent by weight unless otherwise indicated, 1 means liters, μ means microns, $m^2/g$ means meters square per gram, ppm means parts per million by volume, lbs means pounds, and ° C. means degrees Centigrade.

EXAMPLE 1

Preparation of Zinc Titanate Sorbent

A solution of organic binder is prepared by mixing dry METHOCEL™, Grade K-100M, (0.5%) powder in 100 1 water. The Methocel solution (66 lbs) is measured and placed in a baffled tank equipped with a high shear mixer. To this solution, 34 lbs. of tap water is added to bring the total solution weight to 100 lbs. Zinc oxide (13.1 lbs.) and titanium dioxide (8.7 lbs) powders are blended, and added to the METHOCEL™ solution with high shear mixing. Subsequently, bentonite (1.2 lbs) is added, while continuing high shear mixing. The entire slurry is mixed for 5 minutes. The pH of the final slurry is about 5.8, and the slurry has a concentration of 15.3% solids by weight.

Following mixing, the slurry is pumped to an Anhydro Model Type III-A No. 4 spray drier over a period of 29 minutes employing a spinning wheel atomizer. The atomizer is operated at the following conditions: inlet temperature= 343° C., outlet temperature=149° F., and wheel speed=10, 000 RPM.

The sprayed particles are then calcined in air at a temperature of 800° C. for 1.5 hours.

The resulting zinc titanate sorbent material is 95% zinc titanate and 5% bentonite, and is referred to herein as compound "A". The physical and chemical properties of this material are set forth in Table 1, below.

EXAMPLE 2

Preparation of Zinc Titanate Sorbent Containing Surfactant

The material is prepared according to the method set forth in Example 1, with the exception that 5 g of duPont ZONYL TBS™ surfactant diluted 20:1 with deionized water is added to the solution containing zinc oxide, titanium dioxide, and 66 lbs of 0.5% METHOCEL™ K-100M solution. The spray dried product is referred to herein as compound "B". The physical and chemical properties of this material are set forth in Table 1, below.

TABLE 1

| Properties of Zinc Titanate (ZT) Materials. | | | |
|---|---|---|---|
| Characteristic | Spray dried (comparative)[1] | A | B |
| Average Particle Size (μ) | 80 | 80 | 80 |
| Attrition Resistance (% loss)[2] | | | |
| after 5 hr | 50.4 | 86.6 | 13.4 |
| after 20 hr | 55.0 | 94.0 | 14.2 |
| Surface Area ($m^2/g$) | 0.38 | 3.24 | 2.83 |
| Zinc:Titanium Ratio (atomic) | 1.5 | 1.5 | 1.5 |

TABLE 1-continued

Properties of Zinc Titanate (ZT) Materials.

| Characteristic | Spray dried (comparative)[1] | A | B |
|---|---|---|---|
| Sulfur Absorption Capacity at saturation (wt %) | 7.0 | 21.38 | 20.86 |

[1]Samples are prepared by spray-drying according to the method reported in Gupta and Gangwal, Enhanced Durability of Desulfurization Sorbents for Fluidized-Bed Applications, Report to the Department of Energy, November 1992. The sorbent material chosen from the report is based upon having the same sorbent composition.
[2]Using the three-hole attrition test described above.

The results shown in Table 1 demonstrate the superior performance of compounds A and B in terms of sulfur absorption capacity. Compound B also has outstanding attrition resistance. In fact, the attrition resistance value for this material is far superior to most of the commercial catalysts used in fluidized-bed reactors. The superb attrition resistance and extremely high sulfur absorption capacity makes this material extremely attractive for commercial hot-gas desulfurization fluidized-bed applications.

EXAMPLE 3

Sulfur Absorption Capacity of Various Zinc Titanate Sorbent Compositions

Various formulations were employed to provide zinc titanate sorbents of the invention as set forth in Table 2 below. Sorbent materials were prepared in accordance with Example 1 above. All samples contain 0.1 weight percent METHOCEL™ K-100M as the organic binder. The results of the analysis are reported in Table 3 below.

TABLE 2

| Compound | ZT blend[1] | bentonite | kaolinite | Silica[3] | Surfactant[4] |
|---|---|---|---|---|---|
| 1 | 95% | 5% | — | — | — |
| 2 | 80% | 15% | 5% | — | — |
| 3 | 80% | 10% | 10% | — | — |
| 4 | 80% | 5% | 15% | — | — |
| 5 | 95% | 5% | — | — | 0.2 |
| 6 | 80% | 15% | 5% | — | 0.2 |
| 7 | 80% | 10% | 10% | — | 0.2 |
| 8 | 80% | 5% | 15% | — | 0.2 |
| 9 | 70% | 10% | — | 20% | — |
| 10 | 70% | 5% | 10% | 15% | — |
| 11 | 70% | 5% | 15% | 10% | — |
| 12 | 70% | 10% | — | 20% | 0.2 |
| 13 | 70% | 5% | 10% | 15% | 0.2 |
| 14 | 70% | 5% | 15% | 10% | 0.2 |

[1]Zinc oxide/Titanium dioxide blend
[2]Silica sol binder
[3]ZONYL TBS ™

TABLE 3

| Compound | Initial Wt.[1] | Final Wt.[1] | Wt. Gain[2] | % Sulfur Absorption Capacity[3] |
|---|---|---|---|---|
| 1 | 40.69 | 45.04 | 4.35 | 21.38 |
| 2 | 40.99 | 42.43 | 1.44 | 7.03 |
| 3 | 40.76 | 43.87 | 3.11 | 15.26 |
| 4 | 30.64 | 32.39 | 1.75 | 11.42 |
| 5 | 40.36 | 44.57 | 4.21 | 20.86 |
| 6 | 40.53 | 42.73 | 2.20 | 10.86 |
| 7 | 40.38 | 43.42 | 3.04 | 15.06 |
| 8 | 40.65 | 43.39 | 2.74 | 13.48 |
| 9 | * | * | * | * |
| 10 | * | * | * | * |
| 11 | * | * | * | * |
| 12 | 40.48 | 39.45 | −1.03 | * |
| 13 | * | * | * | * |
| 14 | * | * | * | * |

[1]Data obtained in TGA under simulated coal gas conditions at a temperature of 550° C.
[2]Calculated as the difference between the final weight and the initial weight.
[3]Calculated as (weight gain/initial weight) × 100 × 2.
*Percent sulfur absorption capacity was not evaluated for these compounds because the formation of zinc silicate was observed, as evidenced by the appearance of yellow color. Zinc silicate has been observed by the inventors to deactivate the zinc titanate sorbent. Compound 12 was also yellow and was expected to have the highest sulfur absorption capacity among the compositions containing silica. In view of the results from testing this material further testing of the zinc silicate containing compounds was unnecessary.

The results set forth in Table 3 demonstrate that the sulfur absorption capacity of the sorbent decreases dramatically upon the addition of silica. No sulfur absorption capacity was observed for the compound 12. In addition, the foregoing table indicates that the best results in terms of sulfur absorption capacity are obtained with a formulation comprising 5 % bentonite, although mixtures of sodium bentonite with other materials such as kaolinite are also effective. It is to be noted that compounds 3 and 7 which each contained 10% bentonite and 10% kaolinite surpassed the effectiveness of sorbents prepared from other bentonite/kaolinite mixtures. This is believed due to the binding of a portion of the bentonite by the kaolinite resulting in an available amount of 3–4 wt. % of sodium bentonite, which is close to the preferred amount of 5% sodium bentonite.

The foregoing is illustrative of the present invention and is not to be construed as limiting thereof. As will be apparent the invention is susceptible to numerous variations without departing from its spirit and scope as described in the foregoing and defined by the following claims.

That which is claimed is:

1. A zinc titanate sorbent material in the form of generally spherical particles having an average particle size of up to about 300 microns, and of substantially uniform chemical distribution and capable of absorbing sulfur compounds from a gaseous feed in an amount of at least about 15 weight percent based on the weight of the sorbent, said sorbent material being prepared by the process comprising:

(a) forming a zinc oxide/titanium dioxide dry blend comprising between about 0.5 and about 2 parts particulate zinc oxide having a median particle size of less than about 0.5 µ, and about 1 part particulate titanium dioxide having a median particle size of less than about 1 µ;

(b) preparing a substantially uniform aqueous slurry comprising said zinc oxide/titanium dioxide dry blend, organic binder, and an amount of sodium bentonite of between about 3 and 10 weight percent based on the solids weight of said slurry, and wherein said slurry comprises substantially no free silica;

(c) spray drying said aqueous slurry to produce substantially spherical particles; and (d) calcining said particles under conditions sufficient to convert the zinc oxide and titanium dioxide to zinc titanate.

2. The zinc titanate sorbent material according to claim 1, wherein said step (b) of preparing the slurry comprises:

(1) preparing an aqueous solution comprising a sufficient amount of organic binder to provide a solution having a viscosity of between about 400 and about 600 cP;

(2) adding said dry blend to said solution of organic binder and;

(3) adding said sodium bentonite to said solution of organic binder and blend.

3. The zinc titanate sorbent material according to claim 2, wherein said step (1) of preparing an aqueous solution comprises adding between about 0.2 and about 20 weight percent organic binder based upon the weight of the aqueous solution.

4. The zinc titanate sorbent material according to claim 1, wherein said sorbent has a percent sulfur absorption capacity with gaseous feed in an amount of at least about 20 weight percent based on the weight of the sorbent.

5. The zinc titanate sorbent material according to claim 1, wherein said step (a) of forming the dry blend comprises dry mixing about 1.5 parts zinc oxide having a median particle size of between about 0.1 and about 0.5 µ, with about 1 part titanium dioxide having a median particle size of between about 0.1 and about 1 µ.

6. The zinc titanate sorbent material according to claim 1, wherein said step (b) of preparing said slurry further comprises adding reagents selected from the group consisting of $MoO_3$, $CoO_2$, $WO_3$, $MoS_2$, $CoS_2$ and CuO individually, or in any combination in an amount of up to about 10 weight percent based on the solids weight of the slurry.

7. The zinc titanate sorbent material according to claim 1, wherein said titanium dioxide is selected from the group consisting of rutile and anatase, and comprises less than about 10 weight percent of alumina.

8. The zinc titanate sorbent material according to claim 1, wherein said organic binder is selected from the group consisting of hydroxypropyl methyl cellulose, polyvinyl acetate, cellulose, hydropropyl cellulose, starch, lignin sulfonate, molasses, and mixtures thereof.

9. The zinc titanate sorbent material according to claim 1, wherein said organic binder comprises hydroxypropyl methyl cellulose.

10. The zinc titanate sorbent material according to claim 1, wherein said slurry is produced by the process comprising adding an amount available of sodium bentonite of between about 4 and about 6 weight percent.

11. The zinc titanate sorbent material according to claim 1, wherein said slurry is produced by the process comprising adding an amount available of sodium bentonite of about 5 weight percent.

12. The zinc titanate sorbent material according to claim 1, wherein said step (d) of calcining said particles under conditions sufficient to convert zinc oxide and titanium dioxide to zinc titanate comprises calcining said particles at a temperature of between about 750° C. and about 950° C. for between about 1 and about 4 hours.

13. The zinc titanate sorbent material according to claim 1, wherein said step (d) of calcining said particles under conditions sufficient to convert zinc oxide and titanium dioxide to zinc titanate comprises calcining said particles at a temperature of between about 800° C. and about 850° C. for less than about 2 hours.

14. A fluidized bed catalyst for the hydrolysis of COS and for hot-gas desulfurization comprising the zinc titanate sorbent material of claim 1.

* * * * *